United States Patent
Loveall et al.

(10) Patent No.: US 12,427,868 B2
(45) Date of Patent: Sep. 30, 2025

(54) METHODS AND SYSTEM FOR CONTROLLING LOSS MODE FOR AN ELECTRIC MACHINE

(71) Applicant: Ford Global Technologies, LLC, Dearborn, MI (US)

(72) Inventors: Seth Loveall, Dearborn, MI (US); Shunsuke Okubo, Belleville, MI (US); Brendan Diamond, Grosse Pointe, MI (US); Jonathan Hair, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 17/663,802

(22) Filed: May 17, 2022

(65) Prior Publication Data

US 2023/0373316 A1 Nov. 23, 2023

(51) Int. Cl.
| | |
|---|---|
| *B60L 15/20* | (2006.01) |
| *B60L 15/00* | (2006.01) |
| *H02P 21/16* | (2016.01) |
| *H02P 21/22* | (2016.01) |

(52) U.S. Cl.
CPC ......... *B60L 15/2045* (2013.01); *B60L 15/007* (2013.01); *H02P 21/16* (2016.02); *H02P 21/22* (2016.02); *H02P 2205/03* (2013.01)

(58) Field of Classification Search
CPC .... B60L 15/2045; B60L 15/007; H02P 21/16; H02P 21/22; H02P 2205/03
See application file for complete search history.

(56) References Cited

U.S. PATENT DOCUMENTS

| | | | |
|---|---|---|---|
| 8,116,926 B2 | 2/2012 | Okubo et al. | |
| 8,527,123 B2 | 9/2013 | Chrostowski et al. | |
| 9,114,804 B1* | 8/2015 | Shukla | B60W 10/08 |
| 9,416,834 B2 | 8/2016 | O'Meachair | |
| 9,586,485 B2 | 3/2017 | Badger et al. | |
| 9,649,941 B2 | 5/2017 | Wu | |
| 2009/0118080 A1* | 5/2009 | Heap | B60K 6/26 |
| | | | 477/3 |
| 2010/0323844 A1 | 12/2010 | Okubo et al. | |
| 2012/0078455 A1 | 3/2012 | Chrostowski et al. | |
| 2015/0015064 A1 | 1/2015 | Wu | |
| 2015/0307081 A1* | 10/2015 | West | B60W 20/30 |
| | | | 701/99 |
| 2015/0346696 A1 | 12/2015 | Luedtke et al. | |
| 2017/0214351 A1 | 7/2017 | Lelkes et al. | |
| 2018/0079280 A1* | 3/2018 | Leone | B60H 1/00271 |
| 2018/0162370 A1 | 6/2018 | Colavincenzo et al. | |

(Continued)

FOREIGN PATENT DOCUMENTS

| | | |
|---|---|---|
| EP | 2540552 A2 | 1/2013 |
| WO | 2017214234 A1 | 12/2017 |

*Primary Examiner* — Anne Marie Antonucci
*Assistant Examiner* — Luis G Del Valle
(74) *Attorney, Agent, or Firm* — David Kelley; McCoy Russell LLP

(57) ABSTRACT

Systems and methods for operating an electric drive system for an electric or hybrid vehicle is described. In one example, the drive system is operated to provide extra losses during select vehicle operating conditions so that greater amounts of regenerative braking may be generated without having to store larger amounts of electric energy in an electric energy storage device.

20 Claims, 5 Drawing Sheets

(56) References Cited

U.S. PATENT DOCUMENTS

| | | |
|---|---|---|
| 2020/0017097 A1 | 1/2020 | Money et al. |
| 2021/0211078 A1* | 7/2021 | Iezawa .................... H02P 27/08 |
| 2023/0009586 A1* | 1/2023 | Blasinski ................ B60L 15/32 |
| 2023/0054823 A1* | 2/2023 | David .................. B60L 15/2045 |
| 2023/0344375 A1* | 10/2023 | Ling ....................... B60L 15/06 |

* cited by examiner

METHODS AND SYSTEM FOR CONTROLLING LOSS MODE FOR AN ELECTRIC MACHINE

FIELD

The present description relates to methods and a system for operating an electric machine of a hybrid vehicle.

BACKGROUND AND SUMMARY

Electric vehicles and hybrid vehicles include electric drive systems for propulsion. The electric drive systems may include an electric machine that operates as a motor to provide positive torque to a driveline. Alternatively, the electric machine may operate in a generator mode to produce electric power. The electric machine may provide electric power to an electric energy storage device and/or to power electric power consumers while the electric machine is operating in the generator mode. The amount of electric power that is generated by the electric machine may be a function of a requested braking torque, electric energy storage device state of charge, electric machine temperature, electric energy storage device temperature, and other vehicle operating conditions. It may be desirable to operate the electric machine at peak efficiency while the electric machine is operating in generator mode so that a greater amount of the vehicle's kinetic energy may be converted into electric energy and stored in an electric energy storage device. However, there may be times when the electric machine is requested to operate in a regenerative braking mode and slow the vehicle at a rate at which the electric machine may generate sufficient electric charge that may not be storable within the electric energy storage device. In addition, it may be desirable to have an increased level of confidence that an electric drive system is reducing electric energy storage device charging while providing the desired level of regenerative braking.

The inventors herein have recognized the above-mentioned issues and have developed a method for operating an electric drive system, comprising: via a controller, generating an extra operating power loss command for the electric drive system; and adjusting operation of the electric drive system in response to a closed loop extra operating power loss error.

By generating an extra operating power loss command for an electric drive system and adjusting operation of an electric drive system in response to a closed loop extra operating power loss error amount, it may be possible to provide the technical result of providing repeatable and accurate power losses so that desired levels of electric machine charging and regenerative braking may be provided. In particular, actual system power losses may be estimated and the actual system power losses may be applied as feedback to generate an operating power loss error. The operating power loss error may be applied to adjust electric drive system current so that electric drive system efficiency allows the electric drive system to meet charging and regenerative braking requirements.

The present description may provide several advantages. In particular, the approach may allow an electric drive system to provide more accurate control of system losses so that electric energy storage device charging may be improved. Further, the approach may allow a desired level of regenerative braking while a desired level of electric energy storage device charging is being provided. In addition, closed loop control of electric drive system losses may compensate for temperature and rotor loss changes that may be difficult to quantify over a wide range of operating conditions.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
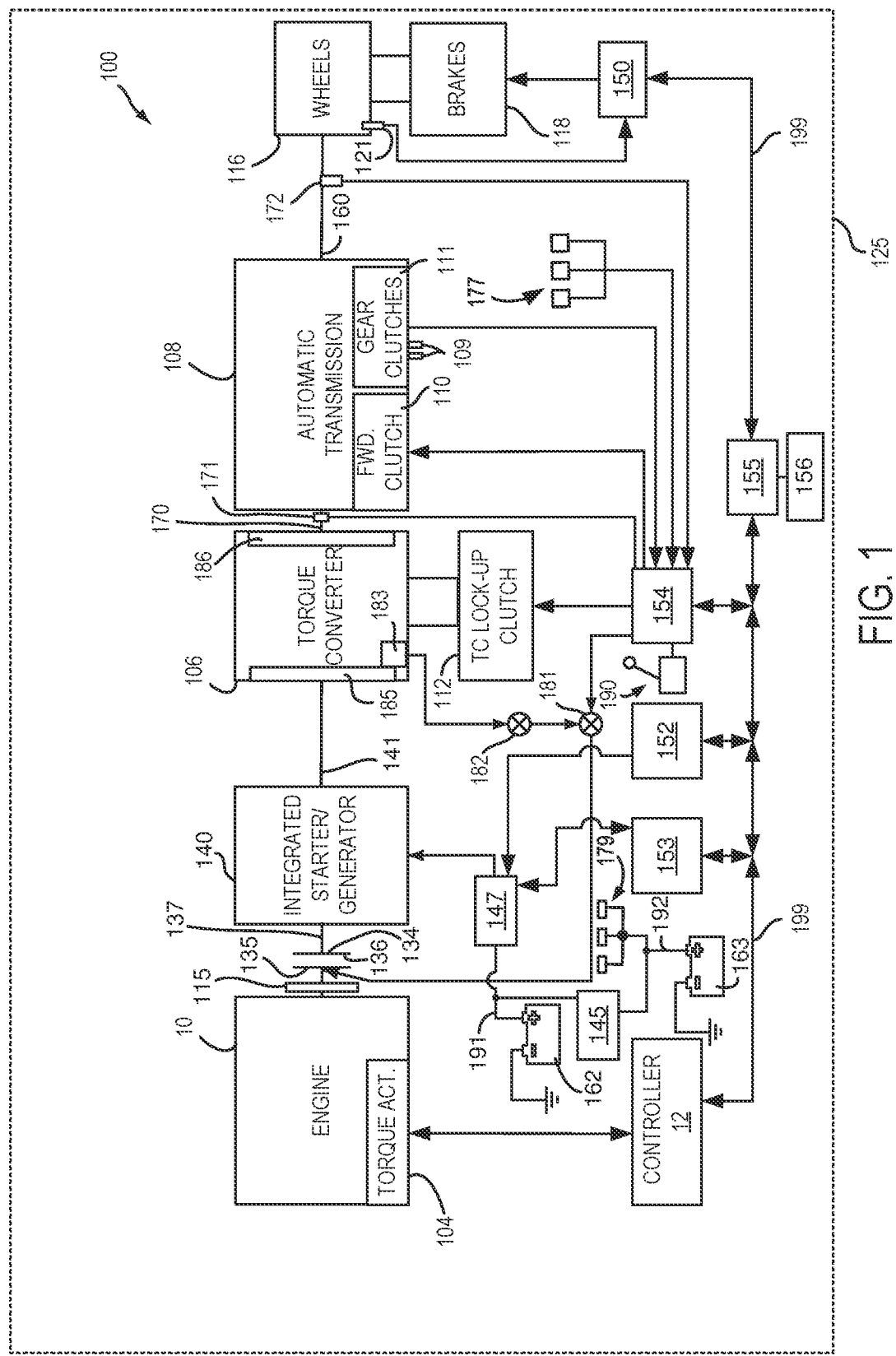
FIG. 1 is a schematic diagram of a hybrid vehicle driveline.
Figure 2:
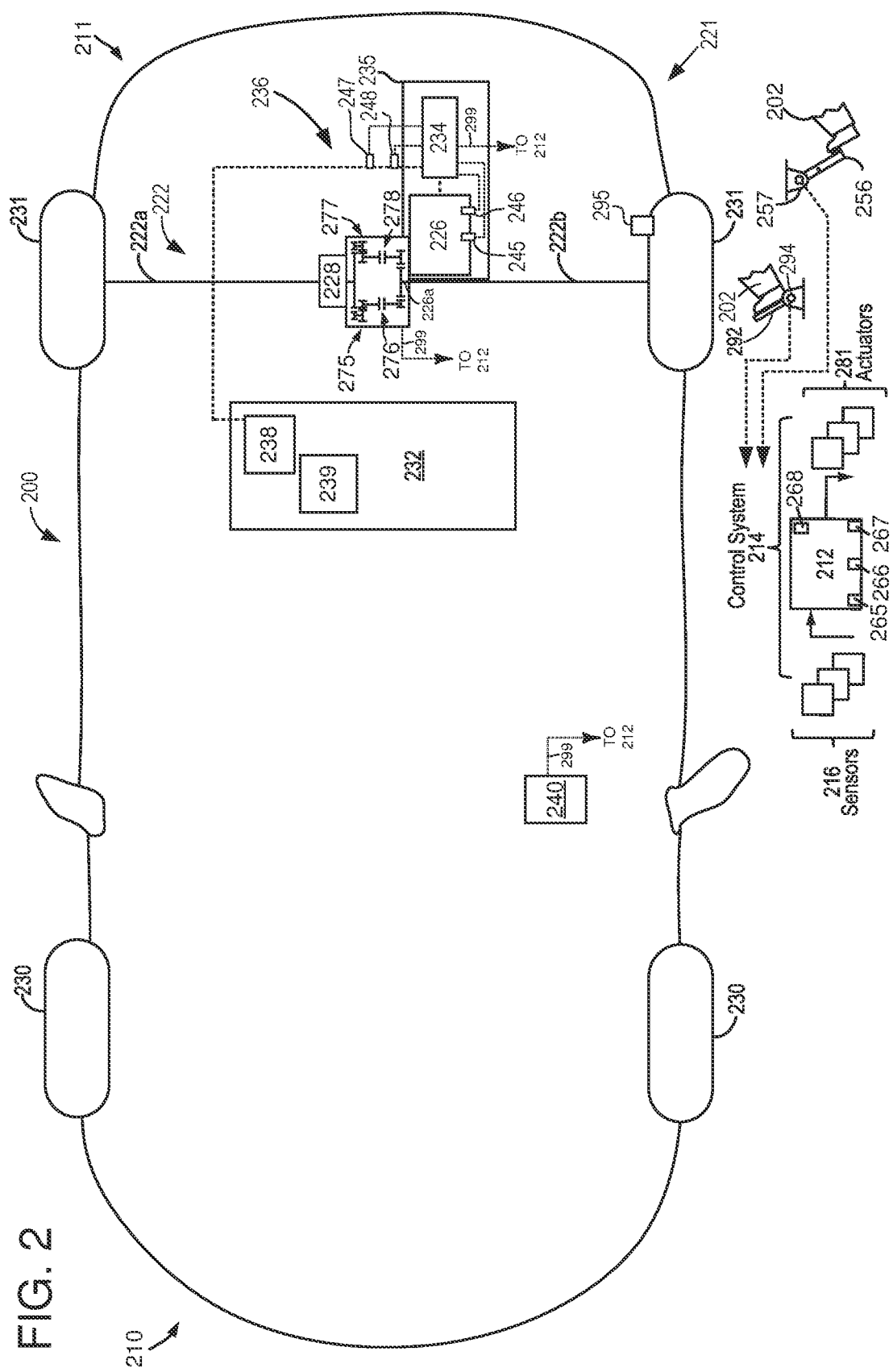
FIG. 2 is a schematic diagram of an electric vehicle driveline.
Figure 3:
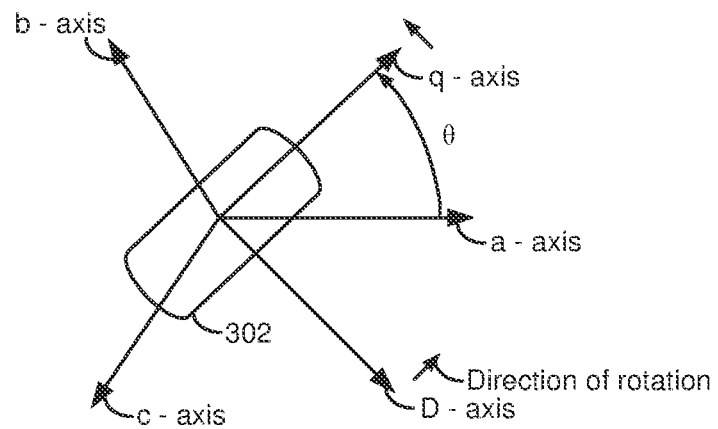
FIG. 3 is a plot showing quadrature axes and direct axes.
Figure 4:
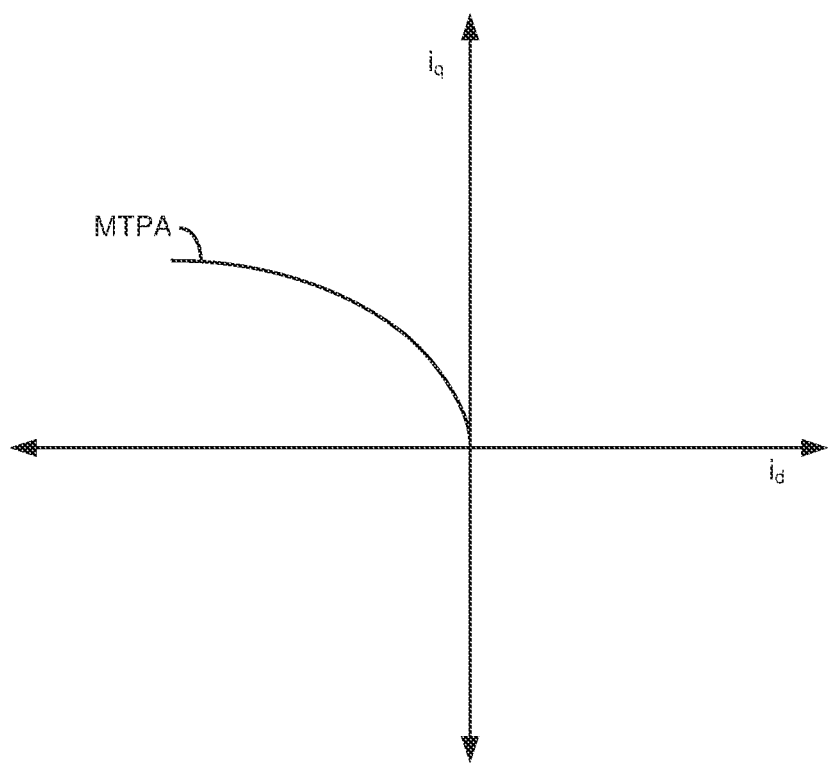
FIG. 4 is a plot showing a maximum torque per ampere curve.
Figure 5:
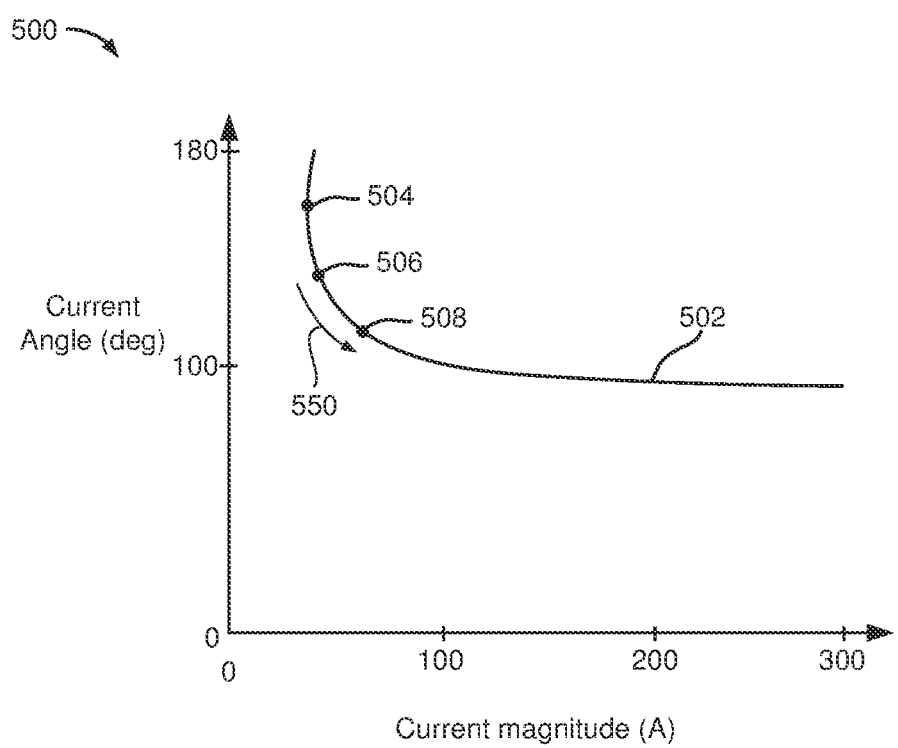
FIG. 5 is a plot showing a relationship between current angle and current magnitude.
Figure 6:
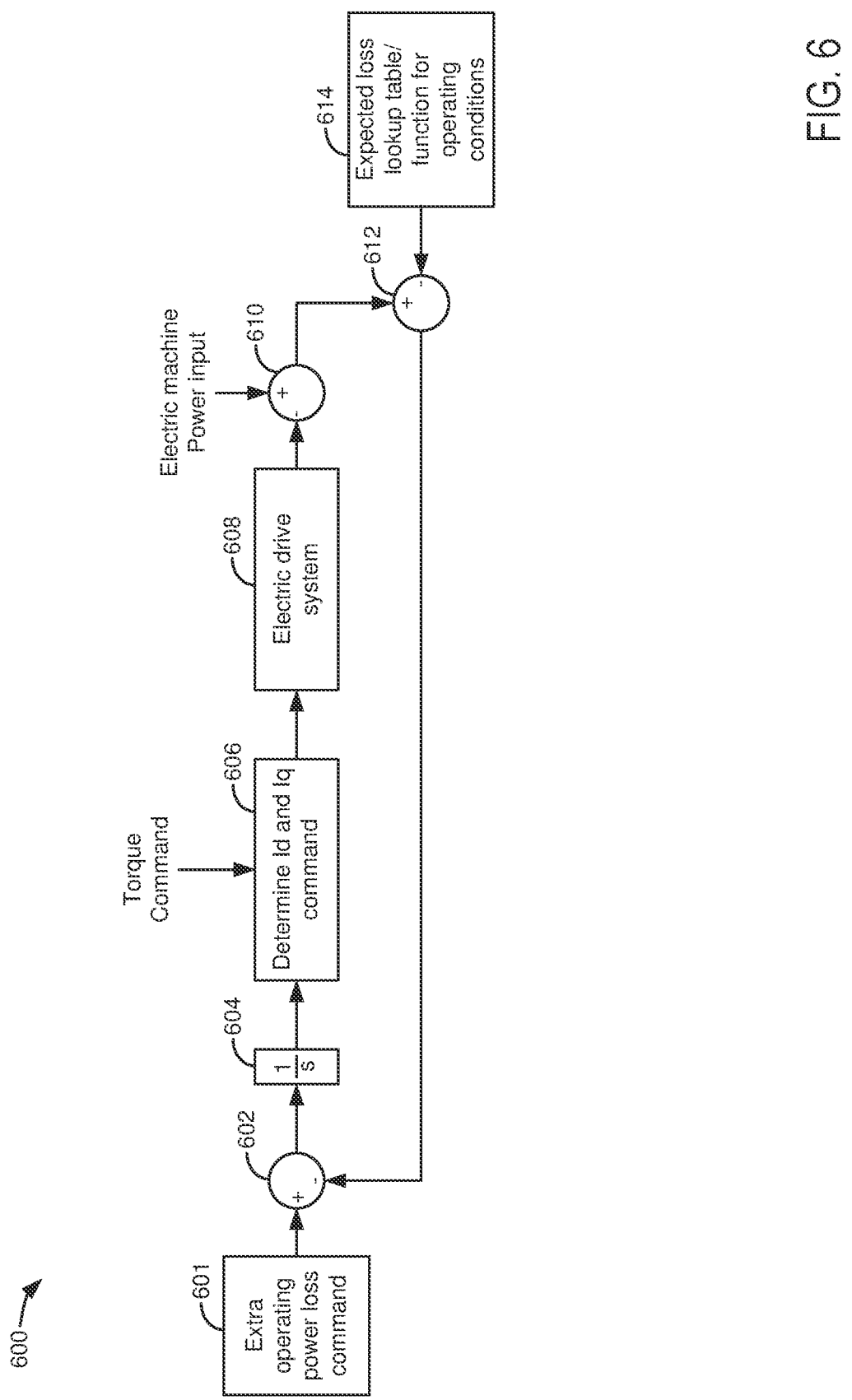
FIG. 6 shows a block diagram of a method for controlling losses of an electric drive system.

The present description is related to operating an electric drive system of a vehicle. The methods and systems described herein may permit more repeatable and accurate control of an electric drive system when the electric drive system is operating in a mode with extra losses. The extra operating power losses may be losses of efficiency that are beyond losses the electric drive system includes when it is operated at its most efficient operating point for a particular torque output of the electric drive system. For example, when an electric drive system is commanded to provide −10 Newton-meters of torque it may have losses of 200 watts while operating at its most efficient operating conditions where $i_d$ (direct or flux current) and $i_q$ (quadrature or torque current) are commanded to minimize electric drive system losses. However, the electric drive system may be commanded to provide −10 Newton-meters of torque with losses of 2000 watts when the vehicle is coasting without input to a driver demand pedal at a particular vehicle speed. Thus, the electric drive system is providing 1800 extra watts of losses when operating with 2000 watts of losses, which may allow less charge to be delivered to the vehicle's electric energy storage device when the electric energy storage device is nearly fully charged. Examples of non-limiting vehicle drivelines are shown in FIGS. 1 and 2. FIGS. 3-5 show plots of coordinate systems and operating conditions for controlling the electric drive system. FIG. 6 shows a block diagram of a method to control the electric drive system.

FIG. 1 is a block diagram of a vehicle 125 including a powertrain or driveline 100. The powertrain of FIG. 1 includes an engine 10. Driveline 100 is shown including vehicle system controller 155, controller 12, electric machine controller 152, transmission controller 154, energy storage device controller 153, and brake controller 150. The controllers may communicate over controller area network (CAN) 199. In addition, vehicle system controller 155 may communicate with communications system 156 (e.g., a transceiver) so that vehicle 125 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 155 may provide commands to controller 12, electric machine controller 152, transmission controller 154, and brake controller 150 to achieve driver input requests and other requests that are based on vehicle operating conditions.

For example, in response to a driver (human or autonomous) releasing a driver demand pedal and vehicle speed, vehicle system controller 155 may request a desired wheel power or a wheel power level to provide a desired rate of vehicle speed reduction. The requested desired wheel power may be provided by vehicle system controller 155 requesting a first braking power from electric machine controller 152 and a second braking power from controller 12, the first and second powers providing a desired driveline braking power at vehicle wheels 116. Vehicle system controller 155 may also request a friction braking power via brake controller 150. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 1. For example, a single controller may take the place of vehicle system controller 155, controller 12, electric machine controller 152, transmission controller 154, and brake controller 150. Alternatively, the vehicle system controller 155 and the controller 12 may be a single unit while the electric machine controller 152, the transmission controller 154, and the brake controller 150 are standalone controllers.

In this example, driveline 100 may be powered by engine 10 and electric machine 140. In other examples, engine 10 may be omitted. Engine 10 may be started with an engine starting system shown in FIG. 1 or via electric machine 140 also known as an integrated starter/generator (ISG). Further, power of engine 10 may be adjusted via power actuator 104, such as a fuel injector, throttle, etc.

Driveline 100 is shown to include an electric energy storage device 162. Electric energy storage device 162 may output a higher voltage (e.g., 48 volts) than electric energy storage device 163 (e.g., 12 volts). DC/DC converter 145 may allow exchange of electrical energy between high voltage bus 191 and low voltage bus 192. High voltage bus 191 is electrically coupled to higher voltage electric energy storage device 162. Low voltage bus 192 is electrically coupled to lower voltage electric energy storage device 163 and sensors/actuators/accessories 179. Sensors/actuators/accessories 179 may include but are not limited to front and rear windshield resistive heaters, vacuum pumps, climate control fans, and lights. Inverter 147 converts DC power to AC power and vice-versa to enable power to be transferred between electric machine 140 and electric energy storage device 162.

An engine output power may be transmitted to an input or first side of driveline disconnect clutch 135 through dual mass flywheel 115. Driveline disconnect clutch 136 may be hydraulically actuated via fluid (e.g., oil) that is pressurized via pump 183. A position of valve 182 (e.g., line pressure control valve) may be modulated to control a pressure (e.g., a line pressure) of fluid that may be supplied to driveline disconnect clutch pressure control valve 181. A position of valve 181 may be modulated to control a pressure of fluid that is supplied to driveline disconnect clutch 135. The downstream or second side 134 of driveline disconnect clutch 136 is shown mechanically coupled to electric machine input shaft 137.

Electric machine 140 may be operated to provide power to driveline 100 or to convert powertrain power into electrical energy to be stored in electric energy storage device 162 in a regeneration mode. Electric machine 140 is in electrical communication with electric energy storage device 162. Further, electric machine 140 directly drives driveline 100 or is directly driven by driveline 100. There are no belts, gears, or chains to couple electric machine 140 to driveline 100. Rather, electric machine 140 rotates at the same rate as driveline 100. Electric energy storage device 162 (e.g., high voltage battery or power source, which may be referred to as a traction battery) may be a battery, capacitor, or inductor. The downstream side of electric machine 140 is mechanically coupled to the impeller 185 of torque converter 106 via shaft 141. The upstream side of the electric machine 140 is mechanically coupled to the driveline disconnect clutch 136. Electric machine 140 may provide a positive power or a negative power to driveline 100 via operating as a motor or generator as instructed by electric machine controller 152.

Torque converter 106 includes a turbine 186 to output power to input shaft 170. Input shaft 170 mechanically couples torque converter 106 to automatic transmission 108. Torque converter 106 also includes a torque converter lock-up clutch 112. Power is directly transferred from impeller 185 to turbine 186 when the torque converter lock-up clutch 112 is locked. Torque converter lock-up clutch 112 is electrically operated by transmission controller 154. Alternatively, torque converter lock-up clutch 112 may be hydraulically locked. In one example, the torque converter may be referred to as a component of the transmission.

When torque converter lock-up clutch 112 is fully disengaged, torque converter 106 transmits engine power to automatic transmission 108 via fluid transfer between the torque converter turbine 286 and torque converter impeller 185, thereby enabling torque multiplication. In contrast, when torque converter lock-up clutch 112 is fully engaged, the engine output power is directly transferred via the torque converter clutch to an input shaft 170 of automatic transmission 108. Alternatively, the torque converter lock-up clutch 112 may be partially engaged, thereby enabling the amount of power directly transferred to the transmission to be adjusted. The transmission controller 154 may be configured to adjust the amount of power transmitted by torque converter lock-up clutch 112 by adjusting the torque converter lock-up clutch in response to various engine operating conditions, or based on a driver-based engine operation request.

Torque converter 106 also includes pump 183 that pressurizes fluid to operate driveline disconnect clutch 136, forward clutch 110, and gear clutches 111. Pump 183 is driven via impeller 185, which rotates at a same speed as electric machine 140.

Automatic transmission 108 includes gear clutches 111 (e.g., gears 1-10) and forward clutch 110. Automatic transmission 108 is a fixed ratio transmission. Alternatively, automatic transmission 108 may be a continuously variable transmission that has a capability of simulating a fixed gear ratio transmission and fixed gear ratios. The gear clutches 111 and the forward clutch 110 may be selectively engaged to change a ratio of an actual total number of turns of input shaft 170 to an actual total number of turns of wheels 116. Gear clutches 111 may be engaged or disengaged via adjusting fluid supplied to the clutches via shift control solenoid valves 109. Power output from the automatic transmission 108 may also be relayed to wheels 116 to propel the vehicle via output shaft 160. Specifically, automatic transmission 108 may transfer an input driving power at the input shaft 170 responsive to a vehicle traveling condition before transmitting an output driving power to the wheels 116. Transmission controller 154 selectively activates or engages torque converter lock-up clutch 112, gear clutches 111, and forward clutch 110. Transmission controller also selectively deactivates or disengages torque converter lock-up clutch 112, gear clutches 111, and forward clutch 110.

A frictional force may be applied to wheels 116 by engaging friction brakes 118. In one example, friction brakes 118 for wheels 116 may be engaged in response to a human driver pressing their foot on a brake pedal (not shown) and/or in response to instructions within brake controller 150. Further, brake controller 150 may apply friction brakes 118 in response to information and/or requests made by vehicle system controller 155. In the same way, a frictional force may be reduced to wheels 116 by disengaging friction brakes 118 in response to the human driver releasing their foot from a brake pedal, brake controller instructions, and/or vehicle system controller instructions and/or information. For example, vehicle brakes may apply a frictional force to wheels 116 via brake controller 150 as part of an automated engine stopping procedure. A braking torque may be determined as a function of brake pedal position.

In response to a request to increase a speed of vehicle 125, vehicle system controller may obtain a driver demand power or power request from a driver demand pedal or other device. Vehicle system controller 155 then allocates a fraction of the requested driver demand power to the engine and the remaining fraction to the electric machine. Vehicle system controller 155 requests the engine power from controller 12 and the electric machine power from electric machine controller 152. If the electric machine power plus the engine power is less than a transmission input power limit (e.g., a threshold value not to be exceeded), the power is delivered to torque converter 106 which then relays at least a fraction of the requested power to transmission input shaft 170. Transmission controller 154 selectively locks torque converter lock-up clutch 112 and engages gears via gear clutches 111 in response to shift schedules and torque converter lock-up clutch lockup schedules that may be based on input shaft power and vehicle speed. In some conditions when it may be desired to charge electric energy storage device 162, a charging power (e.g., a negative electric machine power) may be requested while a non-zero driver demand power is present. Vehicle system controller 155 may request increased engine power to overcome the charging power to meet the driver demand power.

In response to a request to reduce a speed of vehicle 125 and provide regenerative braking, vehicle system controller may provide a negative desired wheel power (e.g., desired or requested powertrain wheel power) based on vehicle speed and brake pedal position. Vehicle system controller 155 then allocates a fraction of the negative desired wheel power to the electric machine 140 and the engine 10. Vehicle system controller may also allocate a portion of the requested braking power to friction brakes 118 (e.g., desired friction brake wheel power). Further, vehicle system controller may notify transmission controller 154 that the vehicle is in regenerative braking mode so that transmission controller 154 shifts gears based on a unique shifting schedule to increase regeneration efficiency. Engine 10 and electric machine 140 may supply a negative power to transmission input shaft 170, but negative power provided by electric machine 140 and engine 10 may be limited by transmission controller 154 which outputs a transmission input shaft negative power limit (e.g., not to be exceeded threshold value). Further, negative power of electric machine 140 may be limited (e.g., constrained to less than a threshold negative threshold power) based on operating conditions of electric energy storage device 162, by vehicle system controller 155, or electric machine controller 152. Any portion of desired negative wheel power that may not be provided by electric machine 140 because of transmission or electric machine limits may be allocated to engine 10 and/or friction brakes 118 so that the desired wheel power is provided by a combination of negative power (e.g., power absorbed) via friction brakes 118, engine 10, and electric machine 140.

Accordingly, power control of the various powertrain components may be supervised by vehicle system controller 155 with local power control for the engine 10, automatic transmission 108, electric machine 140, and friction brakes 118 provided via controller 12, electric machine controller 152, transmission controller 154, and brake controller 150.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 152 may control power output and electrical energy production from electric machine 140 by adjusting current flowing to and from rotor and/or armature windings of electric machine as is known in the art.

Transmission controller 154 receives transmission input shaft position via position sensor 171. Transmission controller 154 may convert transmission input shaft position into input shaft speed via differentiating a signal from position sensor 171 or counting a number of known angular distance pulses over a predetermined time interval. Transmission controller 154 may receive transmission output shaft torque from torque sensor 172. Alternatively, sensor 172 may be a position sensor or torque and position sensors. If sensor 172 is a position sensor, transmission controller 154 may count shaft position pulses over a predetermined time interval to determine transmission output shaft velocity. Transmission controller 154 may also differentiate transmission output shaft velocity to determine transmission output shaft rate of speed change. Transmission controller 154, controller 12, and vehicle system controller 155, may also receive addition transmission information from sensors 177, which may include but are not limited to pump output line pressure sensors, transmission hydraulic pressure sensors (e.g., gear clutch fluid pressure sensors), a transmission fluid temperature sensor, electric machine temperature sensors, gear shift lever sensors, and an ambient temperature sensor. Transmission controller 154 may also receive requested gear input from gear shift selector 190 (e.g., a human/machine interface device). Gear shift selector 190 may include positions for gears 1-N (where N is an upper gear number), D (drive), and P (park).

Brake controller 150 receives wheel speed information via wheel speed sensor 121 and braking requests from vehicle system controller 155. Brake controller 150 may also receive brake pedal position information from position sensor (not shown) in FIG. 1 directly or over CAN 199. Brake controller 150 may provide braking responsive to a wheel power command from vehicle system controller 155. Brake controller 150 may also provide anti-lock and vehicle stability braking to improve vehicle braking and stability. As such, brake controller 150 may provide a wheel power limit (e.g., a threshold negative wheel power not to be exceeded) to the vehicle system controller 155 so that negative electric machine power does not cause the wheel power limit to be exceeded. For example, if brake controller 150 issues a negative wheel power limit of 50 N-m, electric machine power is adjusted to provide less than 50 N-m (e.g., 49 N-m) of negative power at the wheels, including accounting for transmission gearing.

Referring now to FIG. 2, a second example vehicle propulsion system 200 for vehicle 221 is shown. A front portion of vehicle 221 is indicated at 210 and a rear portion of vehicle 221 is indicated at 211. Vehicle propulsion system 200 includes electric machine 226. Electric machine 226 may consume or generate electrical power depending on its operating mode. Throughout the description of FIG. 2, mechanical connections between various components are illustrated as solid lines, whereas electrical connections between various components are illustrated as dashed lines.

Vehicle propulsion system 200 has a rear axle 222. In some examples, rear axle 222 may comprise two half shafts, for example first half shaft 222a, and second half shaft 222b. Vehicle propulsion system 200 further has front wheels 230 and rear wheels 231. Rear wheels 231 may be driven via electric machine 226.

The rear axle 222 is coupled to electric machine 226. Rear drive unit 236 may transfer power from electric machine 226 to axle 222 resulting in rotation of rear wheels 231. Rear drive unit 236 may include a low gear 275 and a high gear 277 that are coupled to electric machine 226 via output shaft 226a of electric machine 226. Low gear 275 may be engaged via fully closing low gear clutch 276. High gear 277 may be engaged via fully closing high gear clutch 278. High gear clutch 278 and low gear clutch 276 may be opened and closed via commands received by rear drive unit 236 over controller area network (CAN) 299. Alternatively, high gear clutch 278 and low gear clutch 276 may be opened and closed via digital outputs or pulse widths provided via control system 214. Rear drive unit 236 may include differential 228 so that torque may be provided to first half shaft 222a and to second half shaft 222b. In some examples, an electrically controlled differential clutch (not shown) may be included in rear drive unit 236.

Electric machine 226 may receive electrical power from onboard electrical energy storage device 232. Furthermore, electric machine 226 may provide a generator function to convert the vehicle's kinetic energy into electrical energy, where the electrical energy may be stored at electric energy storage device 232 for later use by electric machine 226. An inverter system controller (ISC1) 234 may convert alternating current generated by electric machine 226 to direct current for storage at the electric energy storage device 232 and vice versa. Electric drive system 235 includes electric machine 226 and inverter system controller 234. Electric energy storage device 132 may be a battery, capacitor, inductor, or other electric energy storage device. Electric power flowing into electric drive system 235 may be monitored via current sensor 245 and voltage sensor 246. Position and speed of electric machine 226 may be monitored via position sensor 247. Torque generated by electric machine 226 may be monitored via torque sensor 248.

In some examples, electric energy storage device 232 may be configured to store electrical energy that may be supplied to other electrical loads residing on-board the vehicle (other than the motor), including cabin heating and air conditioning, engine starting, headlights, cabin audio and video systems, etc.

Control system 214 may communicate with electric machine 126, energy storage device 232, etc. Control system 214 may receive sensory feedback information from electric drive system 235 and energy storage device 232, etc. Further, control system 214 may send control signals to electric drive system 235 and energy storage device 232, etc., responsive to this sensory feedback. Control system 214 may receive an indication of an operator requested output of the vehicle propulsion system from a human operator 202, or an autonomous controller. For example, control system 214 may receive sensory feedback from pedal position sensor 294 which communicates with pedal 292. Pedal 292 may refer schematically to a driver demand pedal. Similarly, control system 214 may receive an indication of an operator requested vehicle braking via a human operator 202, or an autonomous controller. For example, control system 214 may receive sensory feedback from pedal position sensor 257 which communicates with brake pedal 256.

Energy storage device 232 may periodically receive electrical energy from a power source such as a stationary power grid (not shown) residing external to the vehicle (e.g., not part of the vehicle). As a non-limiting example, vehicle propulsion system 200 may be configured as a plug-in electric vehicle (EV), whereby electrical energy may be supplied to electric energy storage device 132 via the power grid (not shown).

Electric energy storage device 232 includes an electric energy storage device controller 239 and a power distribution module 238. Electric energy storage device controller 239 may provide charge balancing between energy storage element (e.g., battery cells) and communication with other vehicle controllers (e.g., controller 212). Power distribution module 238 controls flow of power into and out of electric energy storage device 232.

One or more wheel speed sensors (WSS) 295 may be coupled to one or more wheels of vehicle propulsion system 200. The wheel speed sensors may detect rotational speed of each wheel. Such an example of a WSS may include a permanent magnet type of sensor.

Controller 212 may comprise a portion of a control system 214. In some examples, controller 212 may be a single controller of the vehicle. Control system 214 is shown receiving information from a plurality of sensors 216 (various examples of which are described herein) and sending control signals to a plurality of actuators 281 (various examples of which are described herein). As one example, sensors 216 may include tire pressure sensor(s) (not shown), wheel speed sensor(s) 295, etc. In some examples, sensors associated with electric machine 226, wheel speed sensor 295, etc., may communicate information to controller 212, regarding various states of electric machine operation. Controller 212 includes non-transitory (e.g., read only memory) 265, random access memory 266, digital inputs/outputs 268, and a microcontroller 267. Controller 212 may receive input data and provide data to human/machine interface 240 via CAN 299.

The systems of FIGS. 1 and 2 provide for a system, comprising: a drive system including an inverter and an electric machine; and a controller including executable instructions stored in non-transitory memory that cause the controller to generate an extra operating power loss command value for the drive system and adjust the extra operating power loss command value in response to a difference between an amount of electric power input to the drive system and an amount of mechanical power generated via the drive system. In a second example, the system includes where the difference between the amount of electric power input to the drive system and the amount of mechanical power generated via the drive system is a drive system power loss value, and further comprising: additional instructions to subtract an expected drive system power loss value from the drive system power loss value. In a third example that may include one or both of the first and second examples, the system includes where subtracting the expected drive system power loss value from the drive system power loss value produces an estimated actual extra operating power loss value, and further comprising: additional instructions to subtract the estimated actual extra operating power loss value from the extra operating power loss command value. In a fourth example that may include one or more of the first through third examples, the system includes where the extra operating power loss command is based on a requested braking torque and a charge power limit of an electric energy storage device. In a fifth example that may include one or more of the first through fourth examples, the system further comprises an electric current sensor and additional instructions to estimate the amount of electric power input to the drive system. In a sixth example that may include one or more of the first through fifth examples, the system further comprises additional instructions to estimate a quadrature current based on a difference between the extra operating power loss command value and an estimated actual extra operating power loss value. In a seventh example that may include one or more of the first through sixth examples, the system further comprises additional instructions to estimate a direct current based on a difference between the extra operating power loss command value and an estimated actual extra operating power loss value. In an eighth example that may include one or more of the first through seventh examples, the system includes where the direct current is a flux current.

Referring now to FIG. 3, an example plot that illustrates a three phase stationary reference frame for a stator of the electric machine and a rotating reference frame used in field oriented control of a permanent magnet synchronous electric machine. Field oriented control allows electric currents in the three phase stationary reference frame to be transformed into decoupled $i_d$ direct current and $i_q$ quadrature current in the rotating reference frame to control flux and torque of the electric machine.

The a-axis represents electric current for the "a" stator phase winding of an electric machine (e.g., 140 of FIG. 1 or 226 of FIG. 2), the b-axis represents electric current for the "b" stator phase winding of the electric machine, and the c-axis represents electric current for the "c" stator phase winding of the electric machine. The q-axis in the rotating reference represents quadrature current $i_q$ and the d-axis represents direct current $i_d$. The q-axis is orthogonal to the d-axis. The rotor of the electric machine is indicated as 502 and the north pole of the rotor is indicated by "N" and the south pole is indicated by "S." The angle of the electric machine's rotor relative to the electric machine's stator is indicated as e and e changes as the electric machine's rotor rotates in the indicated direction.

Referring now to FIG. 4, a plot that shows how direct current $i_d$ and quadrature current $i_q$ affect electric machine torque is shown. The vertical axis represents quadrature current $i_q$ and the magnitude of quadrature current increases in the direction of the vertical axis arrow. The horizontal axis represents direct current $i_d$ and the magnitude of direct current increases in the direction of the vertical axis arrow.

Curve MTPA is a curve that represents a maximum amount of torque per ampere of electric current that may be generated by the electric machine. The values of $i_d$ and $i_q$ that intersect on the MTPA curve are where extra operating power loss is minimized. Therefore, to operate the electric machine in a way that generates extra operating power loss for a given commanded or desired electric machine torque output, values of $i_d$ and $i_q$ may be adjusted such that the location where $i_d$ and $i_q$ intersect is away from the MTPA curve.

Referring to FIG. 5, a curve for determining direct current $i_d$ and quadrature current $i_q$ for a requested or commanded electric machine torque amount and an extra operating power loss command is shown. In this example, plot 500 shows a vertical axis and a horizontal axis. The vertical axis represents an angle of the electric machine's current angle (e.g., the angle of alternating current that is supplied to or generated by the electric machine) and the horizontal axis represents the magnitude of direct current $i_d$ and quadrature current $i_q$.

Curve 502 represents the relationship between the electric machine's current angle and the magnitude of direct current $i_d$ and quadrature current $i_q$ for a specific torque output of the electric machine, −10 Newton-meters in this example. Curve 502 may be generated via equation 1 below. Reference point 504 on curve 502 is a location on curve 502 where extra operating power loss of the electric machine is zero. Losses of the electric machine increase when the current angle, direct current $i_d$, and quadrature current $i_q$ are adjusted to follow curve 502 in the direction that is indicated by arrow 550. Reference point 506 on curve 502 is a location where extra operating power losses of the electric machine and electric drive system have increased to a first particular amount (e.g., 200 watts). Reference point 508 on curve 502 is a location where extra operating power losses of the electric machine and electric drive system have increased to a second particular amount (e.g., 600 watts).

A function that returns a current magnitude (Imag) and a current angle (Θ) may be produced for each curve that represents a relationship between the electric machine's current angle and the magnitude of direct current $i_d$ and quadrature current $i_q$ for a specific torque output of the electric machine. The ordered pairs of current magnitude (Imag) and current angle (e) represent positions along the curve that represents the electric machine's current angle and the magnitude of direct current $i_d$ and quadrature current $i_q$ for a specific torque output of the electric machine. The function may be referenced by extra operating power loss error. For example, a first function may be generated that returns current angle and current magnitude for when the electric machine is generating −10 Newton-meters of torque based on curve 502. The first function returns unique current angles and current magnitudes for each extra operating power loss value. A second function may be generated that returns current angle and current magnitude for when the electric machine is generating −30 Newton-meters of torque based on a curve that is similar to curve 502. The second function returns unique current angles and current magnitudes for each extra operating power loss value.

Each of the functions that return current magnitude (Imag) and current angle (Θ) may be generated by commanding the electric machine to output a constant torque while adjusting a direct current $i_d$ command, adjusting a quadrature current $i_q$ command, and monitoring electric machine drive system power losses. The electric machine drive system power losses may be determined by subtracting the amount of mechanical power generated by the electric machine from the amount of electric power input to the electric machine drive system. The each of the functions that return the current magnitude (Imag) and current angle (Θ) may be generated by plotting the electric machine drive system power losses against current magnitude (Imag) and current angle (Θ) as determined from direct current $i_d$ and quadrature current $i_q$. The functions may be stored in controller memory.

The functions that return the current magnitude (Imag) and current angle (Θ) may be referenced during vehicle operation to determine direct current $i_d$ and quadrature current $i_q$. For example, a table or function in controller memory may be referenced using requested electric machine torque to select the function and the selected function may be referenced by the extra operating loss error. The selected function returns a current magnitude (Imag) and a current angle (Θ). Thus, a function that corresponds to a commanded torque value of −10 Newton-meters may be referenced according to an extra operating power loss of 200 watts. The function returns a current magnitude (Imax) and a current angle (Θ). The direct current $i_d$ and quadrature current $i_q$ may then be determined from the current angle and the magnitude of current via the following equations:

$$T_e = \frac{3}{2} \cdot n_p \cdot [\lambda_m \cdot i_q + (L_d - L_q) \cdot i_d \cdot i_q] \quad \text{(eq. 1)}$$

$$Imag = \sqrt{i_d^2 + i_q^2} \quad \text{(eq. 2)}$$

$$i_d = Imag \cdot -\sin\theta \quad \text{(eq. 3)}$$

$$i_q = Imag \cdot \cos\theta \quad \text{(eq. 4)}$$

where $T_e$ is the requested torque output of the electric machine and electric drive, $n_p$ is the number of poles of the electric machine, $\lambda_m$ is the magnetic flux linkage of the electric machine, $L_d$ is the d-axis inductance, $L_q$ is the q-axis inductance, $i_d$ is the direct current, $i_q$ is the quadrature current, Imag is the current magnitude, and e is the angle of the electric machine rotor relative to the electric machine stator. The values of $\lambda_m$, $L_d$, and $L_q$ may be determined from electric machine data sheets and $T_e$ may be measured.

Referring now to FIG. 6, a block diagram of a method for operating an electric drive system is shown. The method of FIG. 6 may be at least partially implemented as executable instructions stored in controller memory in the systems of FIGS. 1 and 2. Further, the method of FIG. 6 may include actions taken in the physical world to transform operating states of the systems of FIGS. 1 and 2. In addition, in some examples, the method of FIG. 6 may be distributed amongst several controllers where each controller performs a portion of the method.

At block 601, the method of block diagram 600 generates an extra operating power loss command. In one example, the extra power loss command value may be determined via a look-up table that is referenced by driver demand torque, vehicle speed, and battery state of charge. Alternatively, instead of battery state of charge, charge power limit of an electric energy storage device may be the basis for determining the extra power loss command value. The magnitude of the driver demand torque may be increased in a positive direction via applying a driver demand pedal and the magnitude of the driver demand torque may be increased in a negative direction via applying a brake pedal. The extra operating power loss command value may be a larger value when the driver demand torque is negative and large in magnitude while vehicle speed is high and battery state of charge is low. The extra operating power loss command value may be a smaller value when the driver demand torque is negative and small in magnitude while vehicle speed is high and battery state of charge is high. Block 601 outputs an extra operating power loss command to summing junction 602.

At summing junction 602, an estimated actual extra operating power loss value (e.g. output of summing junction 612) is subtracted from the extra operating power loss command that is output from block 601. The result and output of summing junction 602 is an extra operating power loss error value and it is input to block 604.

At block 604, the extra operating power loss error value is integrated. In some examples, block 604 may also multiply a proportion of the extra operating power loss error by a scaler value and add the result to the integrated operating power loss error value. Block 604 outputs the integrated extra operating power loss error value or the proportionately adjusted and integrated extra operating power loss error value to block 606.

At block 606, a requested torque command and the proportionally/integral adjusted extra operating power loss error are received as inputs. One or more functions that return current magnitude (Imag) and current angle (Θ) are referenced according to the requested torque command and the proportionally/integral adjusted extra operating power loss error. The one or more functions are stored in controller memory and the functions may be determined as described with regard to FIG. 5. Thus, if the requested torque command is −20 Newton-meters and the proportionally/integral adjusted extra operating power loss error is 2000 watts, a function that corresponds to the −20 Newton-meters is referenced by the 2000 watt value and the function returns a current magnitude (Imag) and a current angle (Θ). The same function may be referenced when the requested torque command is −20 Newton-meters and the proportionally/integral adjusted extra operating power loss error is 200 watts, but the function will return a different current magnitude (Imag) and a different current angle (Θ). The current magnitude (Imag) and current angle (Θ) may be used along with equations 2-4 to solve for commanded direct current $i_d$ and quadrature current $i_q$, which are output from block 606 and input to block 608.

At block 608, the electric system drive converts the commanded direct current $i_d$ and quadrature current $i_q$ signals to pulses that are output via an inverter. The commanded direct current $i_d$ and quadrature current $i_q$ may be converted to pulses via inverse Park and Clarke transforms. The electric machine may rotate and generate torque according to the commanded direct current $i_d$ and quadrature current $i_q$. The electric machine outputs a mechanical torque at a speed. The mechanical torque may resist wheel and vehicle motion when the electric machine is operated in a generator mode. The torque of the electric machine may be monitored via a torque sensor and the electric machine angular velocity may be monitored via a position sensor. The electric machine torque is multiplied by the electric machine angular velocity to generate a value of electric machine mechanical power, which has units of watts (e.g., 100 Newton-meters*100 RPM/9.549=1047 watts). The electric machine mechanical power input to summing junction 610.

At summing junction 610, the amount of mechanical power generated by the electric machine is subtracted from the electric power that is input to the electric drive system to generate a drive system power loss. The electric power that is input to the electric drive system may be determined by multiplying voltage entering the electric drive system by the amount of current entering the electric drive system. The drive system power loss is input to summing junction 612.

At summing junction 612, an expected power loss is subtracted from the drive system power loss to generate an estimated amount of actual extra operating power loss. The expected power loss amount may be based on referencing a look-up table using electric machine speed, electric machine torque, electric machine temperature, and other operating conditions. Values in the look-up table may be empirically determined via operating the electric drive system and recoding losses for a variety of speeds and torques. The estimated amount of actual extra operating power loss is input to summing junction 602.

Thus, the method of block diagram 600 provides for closed loop control of extra electric drive system losses. The control loop of block diagram 600 may apply proportional or proportional/integral control of extra electric drive system losses. The closed loop control may improve accuracy and repeatability of controlling electric drive system losses.

The method of FIG. 6 provides for a method for operating an electric drive system, comprising: via a controller, generating an extra operating power loss command for the electric drive system; and adjusting operation of the electric drive system in response to a closed loop extra operating power loss error. In a first example, the method includes where the closed loop extra operating power loss error is generated via subtracting an estimated actual extra operating power loss from the extra operating power loss command. In a second example that may include the first example, the method includes where adjusting operation of the electric drive system includes commanding the electric drive system via a quadrature current command and a direct current command. In a third method that may include one or both of the first and second methods, the method further comprises integrating the closed loop extra operating power loss error. In a fourth example that may include one or more of the first through third examples, the method includes where the electric drive system includes an electric machine, and further comprises: estimating a drive system power loss value via the controller. In a fifth example that may include one or more of the first through fourth examples, the method further comprises estimating an actual extra operating power loss based on the drive system power loss value. In a sixth example that may include one or more of the first through fifth examples, the method includes where the actual extra operating power loss is generated via subtracting an expected operating power loss value from the drive system power loss value.

The method of FIG. 6 also provides for a method for operating a drive system, comprising: via a controller, adjusting a direct current command and a quadrature current command in response to a position along a curve, the position along the curve based on an extra operating power loss command; and operating an electric machine in response to the direct current command and the quadrature current command. In a first example, the method includes where the curve represents a relationship between an angular position of a rotor of the electric machine and a magnitude of the direct current and the quadrature current. In a second example that may include the first example, the method further comprises determining an amount of mechanical power generated by the electric machine and an amount of electric power consumed by the drive system. In a third example that may include one or more of the first and second examples, the method further comprises generating a drive system power loss via subtracting the amount of mechanical power generated by the electric machine from the amount of electric power consumed by the drive system. In a fourth example that may include one or more of the first through third examples, the method includes where the curve is based on a torque of the electric machine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an electric drive system, comprising:
   via a controller, generating an extra operating power loss command for the electric drive system, the extra operating power loss command being a requested value of extra operating power loss, where the extra operating power loss is a loss beyond losses occurring when the electric drive system is operating at a most efficient operating point for a particular torque output of the electric drive system; and
   adjusting operation of the electric drive system in response to a closed loop extra operating power loss error, the closed loop extra operating power loss error generated via subtracting an estimated actual extra operating power loss from the extra operating power loss command.

2. The method of claim 1, where adjusting operation of the electric drive system includes commanding the electric drive system via a quadrature current command and a direct current command.

3. The method of claim 1, further comprising integrating the closed loop extra operating power loss error.

4. The method of claim 1, where the electric drive system includes an electric machine, and further comprising:
   estimating a drive system power loss value via the controller.

5. The method of claim 4, further comprising estimating an actual extra operating power loss based on the drive system power loss value.

6. The method of claim 5, where the actual extra operating power loss is generated via subtracting an expected operating power loss value from the drive system power loss value.

7. A system, comprising:
   a drive system including an inverter and an electric machine; and
   a controller including executable instructions stored in non-transitory memory that cause the controller to generate an extra operating power loss command value for the drive system based on a requested braking torque and a charge power limit of an electric energy storage device and adjust the extra operating power loss command value in response to a difference between an amount of electric power input to the drive system and an amount of mechanical power generated via the drive system.

8. The system of claim 7, where the difference between the amount of electric power input to the drive system and the amount of mechanical power generated via the drive system is a drive system power loss value, and further comprising:
   additional instructions to subtract an expected drive system power loss value from the drive system power loss value.

9. The system of claim 8, where subtracting the expected drive system power loss value from the drive system power loss value produces an estimated actual extra operating power loss value, and further comprising:
   additional instructions to subtract the estimated actual extra operating power loss value from the extra operating power loss command value.

10. The system of claim 7, further comprising an electric current sensor and additional instructions to estimate the amount of electric power input to the drive system.

11. The system of claim 7, further comprising additional instructions to estimate a quadrature current based on a difference between the extra operating power loss command value and an estimated actual extra operating power loss value.

12. The system of claim 7, further comprising additional instructions to estimate a direct current based on a difference between the extra operating power loss command value and an estimated actual extra operating power loss value.

13. The system of claim 12, where the direct current is a flux current.

14. A method for operating a drive system, comprising:
   via a controller, adjusting a direct current command and a quadrature current command for a desired torque output in response to a position along a curve, the position along the curve based on an extra operating power loss command, where, for the desired torque output, changing the position along the curve changes an amount of extra operating power losses; and
   operating an electric machine in response to the direct current command and the quadrature current command.

15. The method of claim 14, where the curve represents a relationship between an angular position of a rotor of the electric machine and a magnitude of the direct current command and the quadrature current command.

16. The method of claim 14, further comprising determining an amount of mechanical power generated by the electric machine and an amount of electric power consumed by the drive system.

17. The method of claim 16, further comprising generating a drive system power loss via subtracting the amount of mechanical power generated by the electric machine from the amount of electric power consumed by the drive system.

18. The method of claim 14, where the curve is based on a torque of the electric machine.

19. The method of claim 14, where the position along the curve is determined by referencing a function stored in a memory of the controller that returns a current magnitude and a current angle based on the extra operating power loss command, and where the direct current command and the quadrature current command are calculated using the current magnitude and the current angle.

20. The method of claim 14, further comprising:
   selecting a function from a plurality of functions stored in a memory of the controller based on the desired torque output, where each function of the plurality of functions returns a current magnitude and a current angle for different extra operating power loss command values; and
   determining the direct current command and the quadrature current command based on the current magnitude and the current angle returned by the function for the extra operating power loss command.

* * * * *